US007080257B1

(12) United States Patent
Jakubowski et al.

(10) Patent No.: US 7,080,257 B1
(45) Date of Patent: Jul. 18, 2006

(54) PROTECTING DIGITAL GOODS USING OBLIVIOUS CHECKING

(75) Inventors: Mariusz H. Jakubowski, Bellevue, WA (US); Ramarathnam Venkatesan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 785 days.

(21) Appl. No.: 09/651,901

(22) Filed: Aug. 30, 2000

Related U.S. Application Data

(63) Continuation-in-part of application No. 09/536,033, filed on Mar. 27, 2000.

(51) Int. Cl.
*H04L 9/00* (2006.01)
*G06F 11/30* (2006.01)

(52) U.S. Cl. .................. 713/187; 726/2; 713/167; 713/176; 713/179; 713/190; 713/191; 713/57; 713/58; 713/59; 380/43; 380/49; 380/50; 380/201; 705/50; 705/57; 705/58; 705/59

(58) Field of Classification Search ............... 713/201, 713/167, 176, 187, 179, 190, 191; 712/217; 714/47, 25, 38; 717/129, 143; 703/28; 380/29, 201, 50, 43, 49; 463/19; 345/1.2; 705/50, 57–59; 726/2
See application file for complete search history.

(56) References Cited

U.S. PATENT DOCUMENTS

| | | | | |
|---|---|---|---|---|
| 3,745,316 A | * | 7/1973 | Olah ........................... 714/47 |
| 4,172,213 A | * | 10/1979 | Barnes et al. ................. 380/29 |
| 5,054,787 A | * | 10/1991 | Richardson ................... 463/19 |
| 5,123,045 A | * | 6/1992 | Ostrovsky et al. .......... 713/190 |
| 5,126,728 A | * | 6/1992 | Hall ........................... 713/201 |
| 5,159,630 A | | 10/1992 | Tseng et al. |
| 5,199,069 A | | 3/1993 | Barrett et al. |
| 5,365,589 A | | 11/1994 | Gutowitz |
| 5,420,942 A | | 5/1995 | Levit |
| 5,548,648 A | * | 8/1996 | Yorke-Smith ............... 713/193 |
| 5,742,686 A | | 4/1998 | Finley |
| 5,745,569 A | * | 4/1998 | Moskowitz et al. .......... 705/58 |
| 5,748,741 A | * | 5/1998 | Johnson et al. ............... 380/28 |
| 5,768,372 A | | 6/1998 | Sung et al. |

(Continued)

FOREIGN PATENT DOCUMENTS

WO  WO0031964  6/2000

OTHER PUBLICATIONS

Aucsmith; "Tamper Resistant Software: An Implementation", Information Hiding: First International Workshop (Lecture Notes in Computer Science), vol. 1174, Ross Anderson, Editor, 1996, pp. 317-333.

(Continued)

*Primary Examiner*—Taghi T. Arani
(74) *Attorney, Agent, or Firm*—Lee & Hayes, PLLC

(57) ABSTRACT

Oblivious checking of a digital good is performed by identifying a plurality of key instructions within a function of a digital good. Each key instruction is an instruction that possibly modifies a register or a flag. An extra instruction is then inserted into the function for each of the key instructions. The extra instructions each correspond to one of the key instructions and modify a register in a deterministic fashion based on the corresponding key instruction. A set of inputs to the function are then identified that result in different valid computation paths in the function being taken. A checksum for the function is then generated by using a mapping function which maps the contents of the register to the set of inputs.

39 Claims, 8 Drawing Sheets

U.S. PATENT DOCUMENTS

| | | | |
|---|---|---|---|
| 5,809,306 A * | 9/1998 | Suzuki et al. | 717/143 |
| 5,812,671 A | 9/1998 | Ross, Jr. | |
| 5,852,664 A * | 12/1998 | Iverson et al. | 705/51 |
| 5,915,017 A | 6/1999 | Sung et al. | |
| 5,933,498 A | 8/1999 | Schneck et al. | |
| 5,933,501 A | 8/1999 | Leppek | |
| 5,960,080 A | 9/1999 | Fahlman et al. | |
| 6,041,316 A | 3/2000 | Allen | |
| 6,085,029 A * | 7/2000 | Kolawa et al. | 714/38 |
| 6,240,183 B1 | 5/2001 | Marchant | |
| 6,256,777 B1 * | 7/2001 | Ackerman | 717/129 |
| 6,263,313 B1 | 7/2001 | Milsted et al. | |
| 6,483,600 B1 | 11/2002 | Schuster et al. | |
| 6,507,868 B1 | 1/2003 | Simmon et al. | |
| 6,636,530 B1 | 10/2003 | O'Brien | |
| 6,668,325 B1 * | 12/2003 | Collberg et al. | 713/194 |
| 6,779,114 B1 * | 8/2004 | Chow et al. | 713/189 |
| 6,782,478 B1 * | 8/2004 | Probert | 713/191 |
| 6,801,999 B1 * | 10/2004 | Venkatesan et al. | 713/167 |
| 6,901,516 B1 | 5/2005 | Howard et al. | |
| 7,000,119 B1 * | 2/2006 | Jia et al. | 713/194 |
| 2001/0037450 A1 * | 11/2001 | Metlitski et al. | 713/152 |
| 2005/0210275 A1 * | 9/2005 | Homing et al. | 713/190 |

OTHER PUBLICATIONS

Aucsmith, David "Tamper Resistant Software: An Implementation", Information Hiding: First International Workshop (Lecture Notes in Computer Science), vol. 1174, Ross Anderson, Editor, 1996, pp. 317-333.

* cited by examiner

PROTECTING DIGITAL GOODS USING OBLIVIOUS CHECKING

REFERENCE TO RELATED APPLICATIONS

This is a continuation-in-part of application Ser. No. 09/536,033, filed Mar. 27, 2000, entitled "System and Method for Protecting Digital Goods Using Random and Automatic Code Obfuscation".

TECHNICAL FIELD

This invention relates to systems and methods for protecting digital goods, such as software.

BACKGROUND

Digital goods (e.g., software products, data, content, etc.) are often distributed to consumers via fixed computer readable media, such as a compact disc (CD-ROM), digital versatile disc (DVD), soft magnetic diskette, or hard magnetic disk (e.g., a preloaded hard drive). More recently, more and more content is being delivered in digital form online over private and public networks, such as Intranets and the Internet. Online delivery improves timeliness and convenience for the user, as well as reduces delivery costs for a publisher or developers. Unfortunately, these worthwhile attributes are often outweighed in the minds of the publishers/developers by a corresponding disadvantage that online information delivery makes it relatively easy to obtain pristine digital content and to pirate the content at the expense and harm of the publisher/developer.

One concern of the publisher/developer is the ability to check digital content, after distribution, for alteration. Such checking, is often referred to as SRI (Software Resistance to Interference). The desire to check for such alterations can vary (e.g., to ensure that the content continues to operate as intended by the publisher/developer, to protect against improper copying, etc.).

The unusual property of content is that the publisher/developer (or reseller) gives or sells the content to a client, but continues to restrict rights to use the content even after the content is under the sole physical control of the client. For instance, a software developer typically sells a limited license in a software product that permits a user to load and run the software product on one or more machines (depending upon the license terms), as well as make a back up copy. The user is typically not permitted to make unlimited copies or redistribute the software to others.

These scenarios reveal a peculiar arrangement. The user that possesses the digital bits often does not have full rights to their use; instead, the provider retains at least some of the rights. In a very real sense, the legitimate user of a computer can be an adversary of the data or content provider.

One of the uses for SRI is to provide "digital rights management" (or "DRM") protection to prevent unauthorized distribution of, copying and/or illegal operation of, or access to the digital goods. An ideal digital goods distribution system would substantially prevent unauthorized distribution/use of the digital goods. Digital rights management is fast becoming a central requirement if online commerce is to continue its rapid growth. Content providers and the computer industry must quickly address technologies and protocols for ensuring that digital goods are properly handled in accordance with the rights granted by the developer/publisher. If measures are not taken, traditional content providers may be put out of business by widespread theft or, more likely, will refuse altogether to deliver content online.

Various DRM techniques have been developed and employed in an attempt to thwart potential pirates from illegally copying or otherwise distributing the digital goods to others. For example, one DRM technique includes requiring the consumer to insert the original CD-ROM or DVD for verification prior to enabling the operation of a related copy of the digital good. Unfortunately, this DRM technique typically places an unwelcome burden on the honest consumer, especially those concerned with speed and productivity. Moreover, such techniques are impracticable for digital goods that are site licensed, such as software products that are licensed for use by several computers, and/or for digital goods that are downloaded directly to a computer. Additionally, it is not overly difficult for unscrupulous individuals/organizations to produce working pirated copies of the CD-ROM.

Another DRM technique includes requiring or otherwise encouraging the consumer to register the digital good with the provider, for example, either through the mail or online via the Internet or a direct connection. Thus, the digital good may require the consumer to enter a registration code before allowing the digital good to be fully operational or the digital content to be fully accessed. Unfortunately, such DRM techniques are not always effective since unscrupulous individuals/organizations need only break through or otherwise undermine the DRM protections in a single copy of the digital good. Once broken, copies of the digital good can be illegally distributed, hence such DRM techniques are considered to be Break-Once, Run-Everywhere (BORE) susceptible. Various different techniques can be used to defeat BORE, such as per-user software individualization, watermarks, etc. However, a malicious user may still be able to identify and remove from the digital good these various protections.

Accordingly, there remains a need for a technique that addresses the concerns of the publisher/developer, allowing alteration of the digital content to be identified to assist in protecting the content from many of the known and common attacks, but does not impose unnecessary and burdensome requirements on legitimate users.

SUMMARY

Oblivious checking of digital goods is described herein.

According to one aspect, a plurality of key instructions within a function of a digital good are identified. Each key instruction is an instruction that possibly modifies a register or a flag. An extra instruction is then inserted into the function for each of the key instructions. The extra instructions each correspond to one of the key instructions and modify a register in a deterministic fashion based on the corresponding key instruction.

A set of inputs to the function are then identified that result in different valid computation paths in the function being taken. A checksum for the function is then generated by using a mapping function which maps the contents of the register to the set of inputs.

According to another aspect, the extra instructions are added to the function in appropriate locations such that the extra instruction corresponding to a key instruction is always executed if the corresponding key instruction is executed, and is executed after the corresponding key instruction is executed.

BRIEF DESCRIPTION OF THE DRAWINGS

The same numbers are used throughout the drawings to reference like elements and features.

DETAILED DESCRIPTION

A digital rights management (DRM) distribution architecture produces and distributes digital goods in a fashion that renders the digital goods resistant to many known forms of attacks. The DRM distribution architecture protects digital goods by automatically and randomly manipulating portions of the code using multiple protection techniques. Essentially any type of digital good may be protected using this architecture, including such digital goods as software, audio, video, and other content. For discussion purposes, many of the examples are described in the context of software goods, although most of the techniques described herein are effective for non-software digital goods, such as audio data, video data, and other forms of multimedia data.

DRM Distribution Architecture

Figure 1:
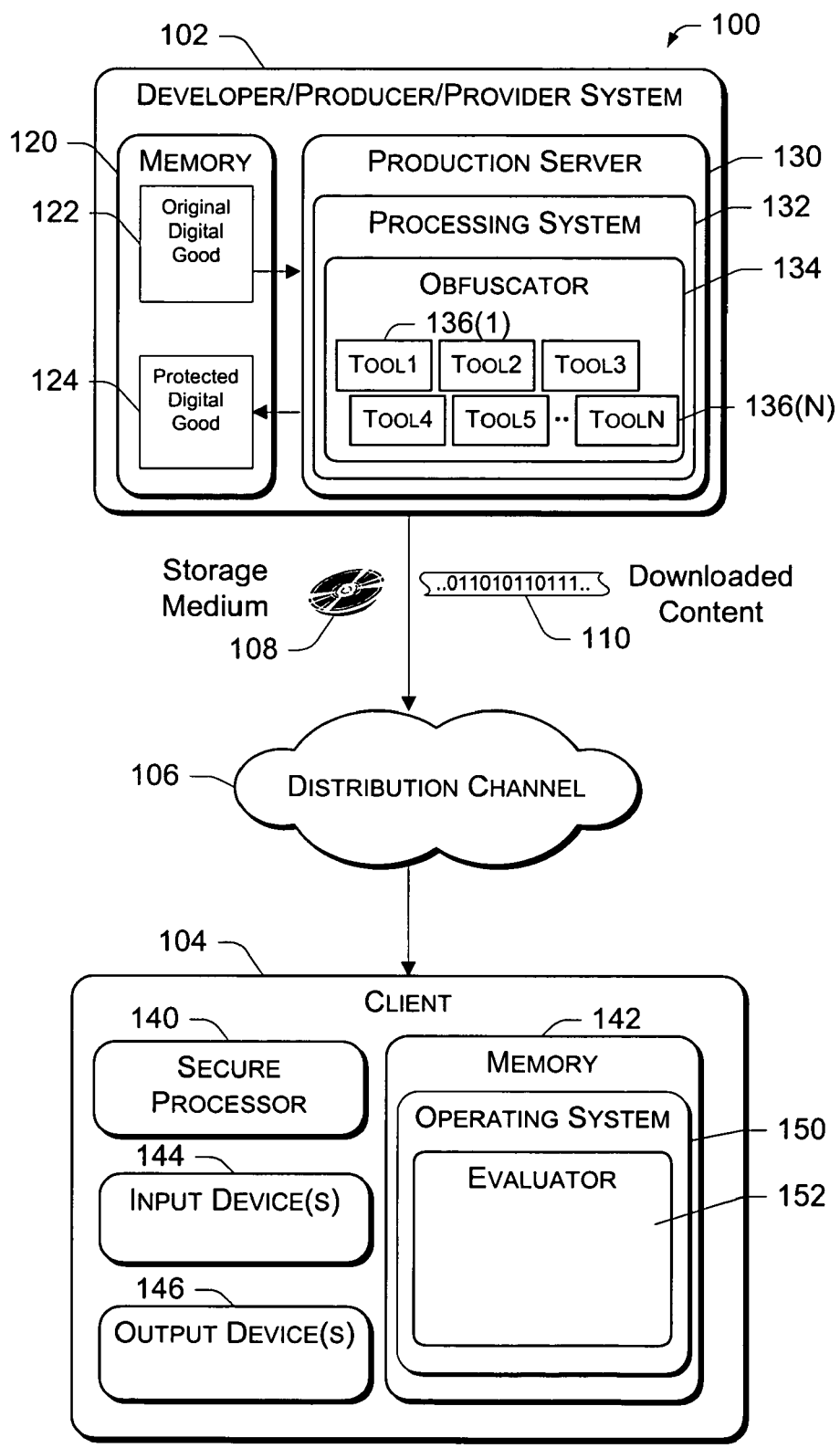
FIG. 1 is a block diagram of a DRM distribution architecture that protects digital goods by automatically and randomly obfuscating portions of the goods using various tools.

FIG. 1 shows a DRM distribution architecture 100 in which digital goods (e.g., software, video, audio, etc.) are transformed into protected digital goods and distributed in their protected form. The architecture 100 has a system 102 that develops or otherwise produces the protected good and distributes the protected good to a client 104 via some form of distribution channel 106. The protected digital goods may be distributed in many different ways. For instance, the protected digital goods may be stored on a computer-readable medium 108 (e.g., CD-ROM, DVD, floppy disk, etc.) and physically distributed in some manner, such as conventional vendor channels or mail. The protected goods may alternatively be downloaded over a network (e.g., the Internet) as streaming content or files 110.

The developer/producer system 102 has a memory 120 to store an original digital good 122, as well as the protected digital good 124 created from the original digital good. The system 102 also has a production server 130 that transforms the original digital good 122 into the protected digital good 124 that is suitable for distribution. The production server 130 has a processing system 132 and implements an obfuscator 134 equipped with a set of multiple protection tools 136(1)–136(N). Generally speaking, the obfuscator 134 automatically parses the original digital good 122 and applies selected protection tools 136(1)–136(N) to various portions of the parsed good in a random manner to produce the protected digital good 124. Applying a mixture of protection techniques in random fashion makes it extremely difficult for pirates to create illicit copies that go undetected as legitimate copies.

The original digital good 122 represents the software product or data as originally produced, without any protection or code modifications. The protected digital good 124 is a unique version of the software product or data after the various protection schemes have been applied. The protected digital good 124 is functionally equivalent to and derived from the original data good 122, but is modified to prevent potential pirates from illegally copying or otherwise distributing the digital goods to others. In addition, some modifications enable the client to determine whether the product has been tampered with.

The developer/producer system 102 is illustrated as a single entity, with memory and processing capabilities, for ease of discussion. In practice, however, the system 102 may be configured as one or more computers that jointly or independently perform the tasks of transforming the original digital good into the protected digital good.

The client 104 has a secure processor 140, memory 142 (e.g., RAM, ROM, Flash, hard disk, CD-ROM, etc.), one or more input devices 144 (e.g., keyboard, joystick, voice recognition, etc.), and one or more output devices 146 (e.g., monitor, speakers, etc.). The client may be implemented as a general purpose computing unit (e.g., desktop PC, laptop, etc.) or as other devices, such as set-top boxes, audio/video appliances, game consoles, and the like.

The client 104 runs an operating system 150, which is stored in memory 142 and executed on the secure processor 140. Operating system 150 represents any of a wide variety of operating systems, such as a multi-tasking, open platform system (e.g., a "Windows"-brand operating system from Microsoft Corporation). The operating system 150 includes an evaluator 152 that evaluates the protected digital goods prior to their utilization to determine whether the protected digital 9 goods have been tampered with or modified in any manner. In particular, the evaluator 152 is configured to analyze the various portions according to the different protection schemes originally used to encode the good to evaluate the authenticity of the digital good.

Some protection schemes involve executing instructions, analyzing data, and performing other tasks in the most secure areas of the operating system 150 and secure processor 140. Accordingly, the evaluator 152 includes code portions 16 that may be executed in these most secure areas of the operating system and secure processor. Although the evaluator 152 is illustrated as being integrated into the operating system 150, it may be implemented separately from the operating system.

In the event that the client detects some tamper activity, the secure processor 140 acting alone, or together with the operating system 150, may decline to execute the suspect digital code. For instance, the client may determine that the software product is an illicit copy because the evaluations performed by the evaluator 152 are not successful. In this case, the evaluator 152 informs the secure processor 140 and/or the operating system 150 of the suspect code and the secure processor 140 may decline to run that software product.

It is further noted that the operating system 150 may itself be the protected digital good. That is, the operating system 150 may be modified with various protection schemes to produce a product that is difficult to copy and redistribute, or at least makes it easy to detect such copying. In this case, the secure processor 140 may be configured to detect an improper version of the operating system during the boot process (or at other times) and prevent the operating system from fully or partially executing and obtaining control of system resources.

For protected digital goods delivered over a network, the client 104 implements a tamper-resistant software (not shown or implemented as part of the operating system 150) to connect to the server 102 using an SSL (secure sockets layer) or other secure and authenticated connection to purchase, store, and utilize the digital good. The digital good may be encrypted using well-known algorithms (e.g., RSA) and compressed using well-known compression techniques (e.g., ZIP, RLE, AVI, MPEG, ASF, WMA, MP3).

Obfuscating System

Figure 2:
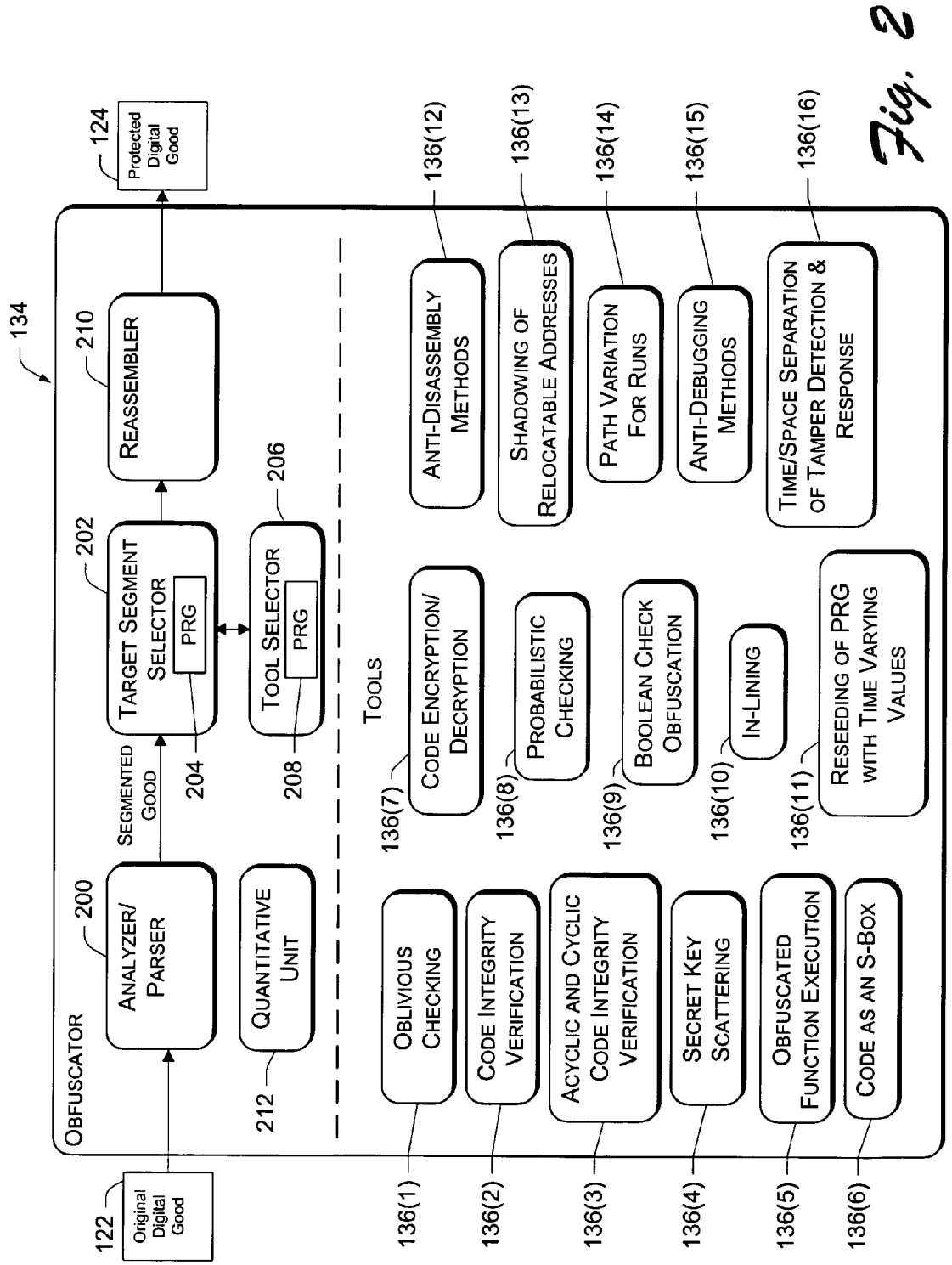
FIG. 2 is a block diagram of a system for producing a protected digital good from an original good.

FIG. 2 shows the obfuscator 134 implemented by the production server 130 in more detail. The obfuscator 134 is configured to transform an original digital good 122 into a protected digital good 124. The obfuscating process is usually applied just before the digital good is released to manufacture or prior to being downloaded over a network. The process is intended to produce a digital good that is protected from various forms of attacks and illicit copying activities. The obfuscator 134 may be implemented in software (or firmware), or a combination of hardware and software/firmware.

The obfuscator 134 has an analyzer 200 that analyzes the original digital good 122 and parses it into multiple segments. The analyzer 200 attempts to intelligently segment the digital good along natural boundaries inherent in the product. For instance, for a software product, the analyzer 200 may parse the code according to logical groupings of instructions, such as routines, or sub-routines, or instruction sets. Digital goods such as audio or video products may be parsed according to natural breaks in the data (e.g., between songs or scenes), or at statistically computed or periodic junctures in the data.

In one specific implementation for analyzing software code, the analyzer 200 may be configured as a software flow analysis tool that converts the software program into a corresponding flow graph. The flow graph is partitioned into many clusters of nodes. The segments may then take the form of sets of one or more nodes in the flow graph. For more information on this technique, the reader is directed to co-pending U.S. patent application Ser. No. 09/525,694, entitled "A Technique for Producing, Through Watermarking, Highly Tamper-Resistant Executable Code and Resulting "Watermarked" Code So Formed", which was filed Mar. 14, 2000, in the names of Ramarathnam Venkatesan and Vijay Vazirani. This Application is assigned to Microsoft Corporation and is hereby incorporated by reference.

The segments may overlap one another. For instance, one segment may contain a set of instructions in a software program and another segment may contain a subset of the instructions, or contain some but not all of the instructions.

The obfuscator 134 also has a target segment selector 202 that randomly applies various forms of protection to the segmented digital good. In the illustrated implementation, the target selector 202 implements a pseudo random generator (PRG) 204 that provides randomness in selecting various segments of the digital good to protect. The target segment selector 202 works together with a tool selector 206, which selects various tools 136 to augment the selected segments for protection purposes. In one implementation, the tool selector 206 may also implement a pseudo random generator (PRG) 208 that provides randomness in choosing the tools 136.

The tools 136 represent different schemes for protecting digital products. Some of the tools 136 are conventional, while others are not. These distinctions will be noted and emphasized throughout the continuing discussion. FIG. 2 shows sixteen different tools or schemes that create a version of a digital good that is difficult to copy and redistribute without detection and that is resistant to many of the known pirate attacks, such as BORE (break once, run everywhere) attacks and disassembly attacks.

The illustrated tools include oblivious checking 136(1), code integrity verification 136(2), acyclic and cyclic code integrity verification 136(3), secret key scattering 136(4), obfuscated function execution 136(5), code as an S-box 136(6), encryption/decryption 136(7), probabilistic checking 136(8), Boolean check obfuscation 136(9), in-lining 136(10), reseeding of PRG with time varying inputs 136(11), anti-disassembly methods 136(12), shadowing of relocatable addresses 136(13), varying execution paths between runs 136(14), anti-debugging methods 136(15), and time/space separation between tamper detection and response 136(16). The tools 136(1)–136(16) are examples of possible protection techniques that may be implemented by the obfuscator 134. It is noted that more or less than the tools may be implemented, as well as other tools not mentioned or illustrated in FIG. 2. The exemplary tools 136(1)–136(16) are described below in more detail beneath the heading "Exemplary Protection Tools".

The target segment selector 202 and the tool selector 206 work together to apply various protection tools 136 to the original digital good 122 to produce the protected digital good 124. For segments of the digital good selected by the target segment selector 202 (randomly or otherwise), the tool selector 206 chooses various protection tools 136(1)–136(16) to augment the segments. In this manner, the obfuscator automatically applies a mixture of protection techniques in a random manner that makes it extremely difficult for pirates to create usable versions that would not be detectable as illicit copies.

The obfuscator 134 also includes a segment reassembler 210 that reassembles the digital good from the protected and non-protected segments. The reassembler 210 outputs the protected digital good 124 that is ready for mass production and/or distribution.

The obfuscator 134 may further be configured with a quantitative unit 212 that enables a producer/developer to define how much protection should be applied to the digital good. For instance, the producer/developer might request that any protection not increase the runtime of the product. The producer/developer may also elect to set the number of checkpoints (e.g., 500 or 1000) added to the digital good as a result of the protection, or define a maximum number of lines/bytes of code that are added for protection purposes. The quantitative unit 212 may include a user interface (not shown) that allows the user to enter parameters defining a quantitative amount of protection.

The quantitative unit 212 provides control information to the analyzer 200, target segment selector 202, and tool selector 206 to ensure that these components satisfy the specified quantitative requirements. Suppose, for example, the producer/developer enters a predefined number of checkpoints (e.g., 500). With this parameter, the analyzer 200 ensures that there are a sufficient number of segments (e.g., >500), and the target segment selector 202 and tool selector 206 apply various tools to different segments such that the resulting number of checkpoints approximates 500.

General Operation

Figure 3:
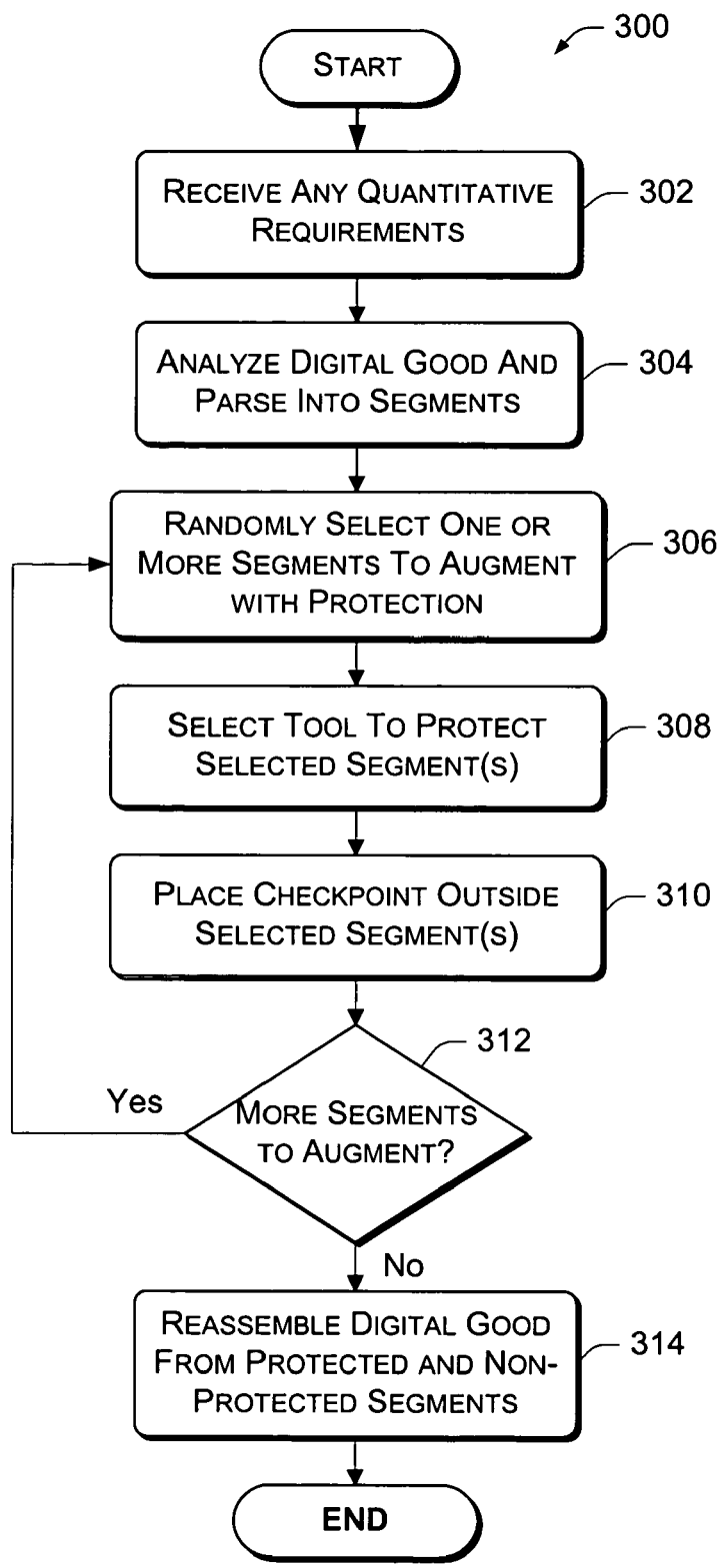
FIG. 3 is a flow diagram of a protection process implemented by the system of FIG. 2.

FIG. 3 shows the obfuscation process 300 implemented by the obfuscator 134 at the production server 102. The obfuscation process is implemented in software and will be described with additional reference to FIGS. 1 and 2.

At block 302, the quantitative unit 212 enables the developer/producer to enter quantitative requirements regarding how much protection should be applied to the digital good. The developer/producer might specify, for example, how many checkpoints are to be added, or how many additional lines of code, or whether runtime can be increased as a result of the added protection.

At block 304, the analyzer/parser 200 analyzes an original digital good and parses it into plural segments. The encoded parts may partially or fully overlap with other encoded parts.

The target segment selector 202 chooses one or more segments (block 306). Selection of the segment may be random with the aid of the pseudo random generator 204. At block 308, the tool selector 206 selects one of the tools 136(1)–136(16) to apply to the selected section. Selection of the tools may also be a randomized process, with the assistance of the pseudo random generator 208.

To illustrate this dual selection process, suppose the segment selector 202 chooses a set of instructions in a software product. The tool selector 206 may then use a tool that codes, manipulates or otherwise modifies the selected segment. The code integrity verification tool 136(2), for example, places labels around the one or more segments to define the target segment. The tool then computes a checksum of the bytes in the target segment and hides the resultant checksum elsewhere in the digital good. The hidden checksum may be used later by tools in the client 104 to determine whether the defined target segment has been tampered with.

Many of the tools 136 place checkpoints in the digital good that, when executed at the client, invoke utilities that analyze the segments for possible tampering. The code verification tool 136(2) is one example of a tool that inserts a checkpoint (i.e., in the form of a function call) in the digital good outside of the target segment. For such tools, the obfuscation process 300 includes an optional block 310 in which the checkpoint is embedded in the digital good, but outside of the target segment. In this manner, the checkpoints for invoking the verification checks are distributed throughout the digital good. In addition, placement of the checkpoints throughout the digital good may be random.

The process of selecting segment(s) and augmenting them using various protection tools is repeated for many more segments, as indicated by block 312. Once the obfuscator has finished manipulating the segments of the digital code (i.e., the "no" branch from block 312), the reassembler 210 reassembles the protected and non-protected segments into the protected digital good (block 314).

Figure 4:
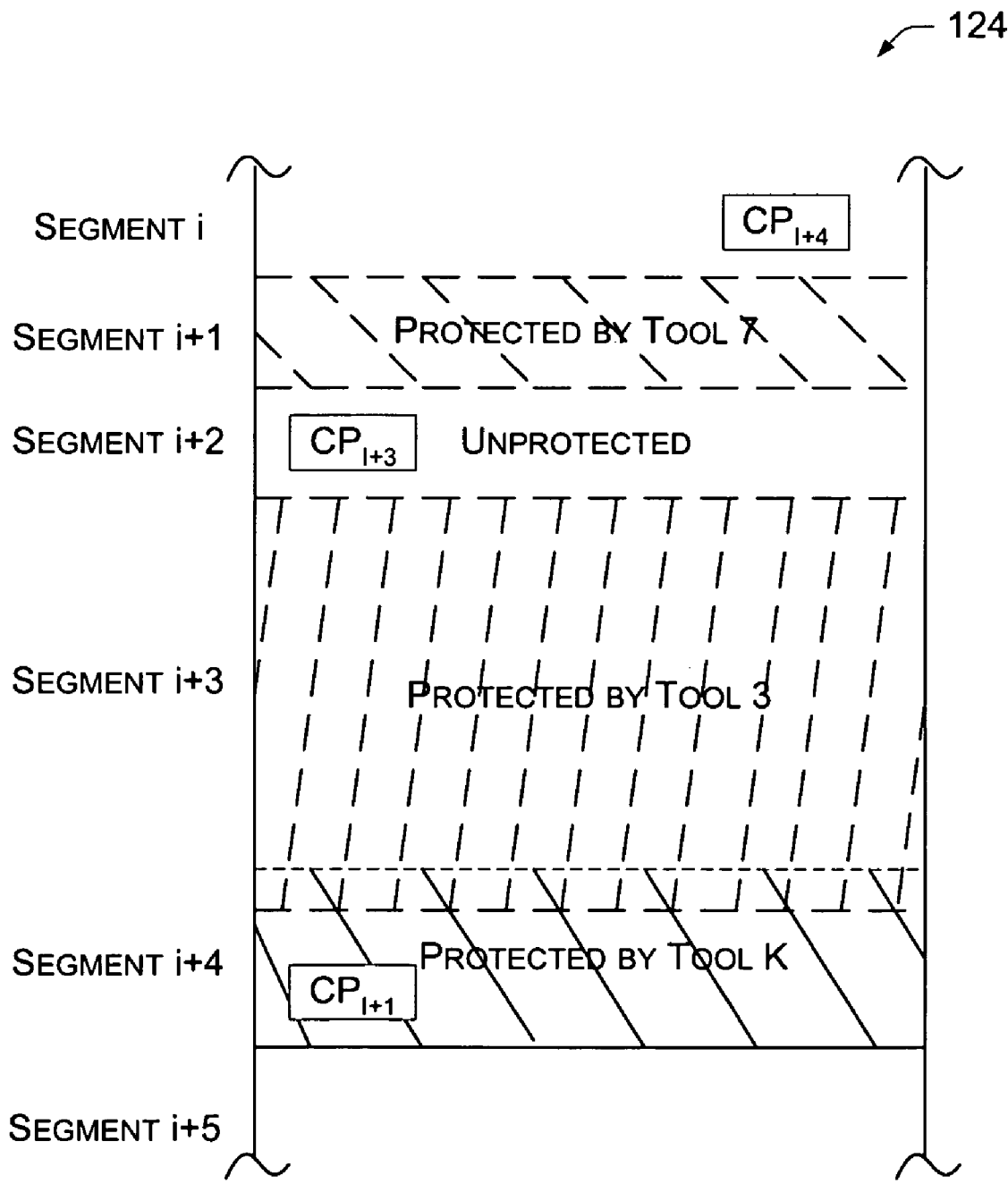
FIG. 4 is a diagrammatical illustration of a digital good after being coded using the process of FIG. 3.

FIG. 4 shows a portion of the protected digital good 124 having segments i, i+1, i+2, i+3, i+4, i+5, and so forth. Some of the segments have been augmented using different protection schemes. For instance, segment i+1 is protected using tool 7. The checkpoint $CP_{i+1}$ for this segment is located in segment i+4. Similarly, segment i+3 is protected using tool 3, and the checkpoint $CP_{i+3}$ for this segment is located in segment i+2. Segment i+4 is protected using tool K, and the checkpoint $CP_{+4}$ for this segment is located in segment i.

Notice that the segments may overlap one another. In this example, segment i+3 and i+4 partially overlap, thus sharing common data or instructions. Although not illustrated, two or more segments may also completely overlap, wherein one segment is encompassed entirely within another segment. In such situations, a first protection tool is applied to one segment, and then a second protection tool is applied to another segment, which includes data and/or instructions just modified by the first protection tool.

Notice also that not all of the segments are necessarily protected. For instance, segment i+2 is left "unprotected" in the sense that no tool is applied to the data or instructions in that segment.

Figure 5:
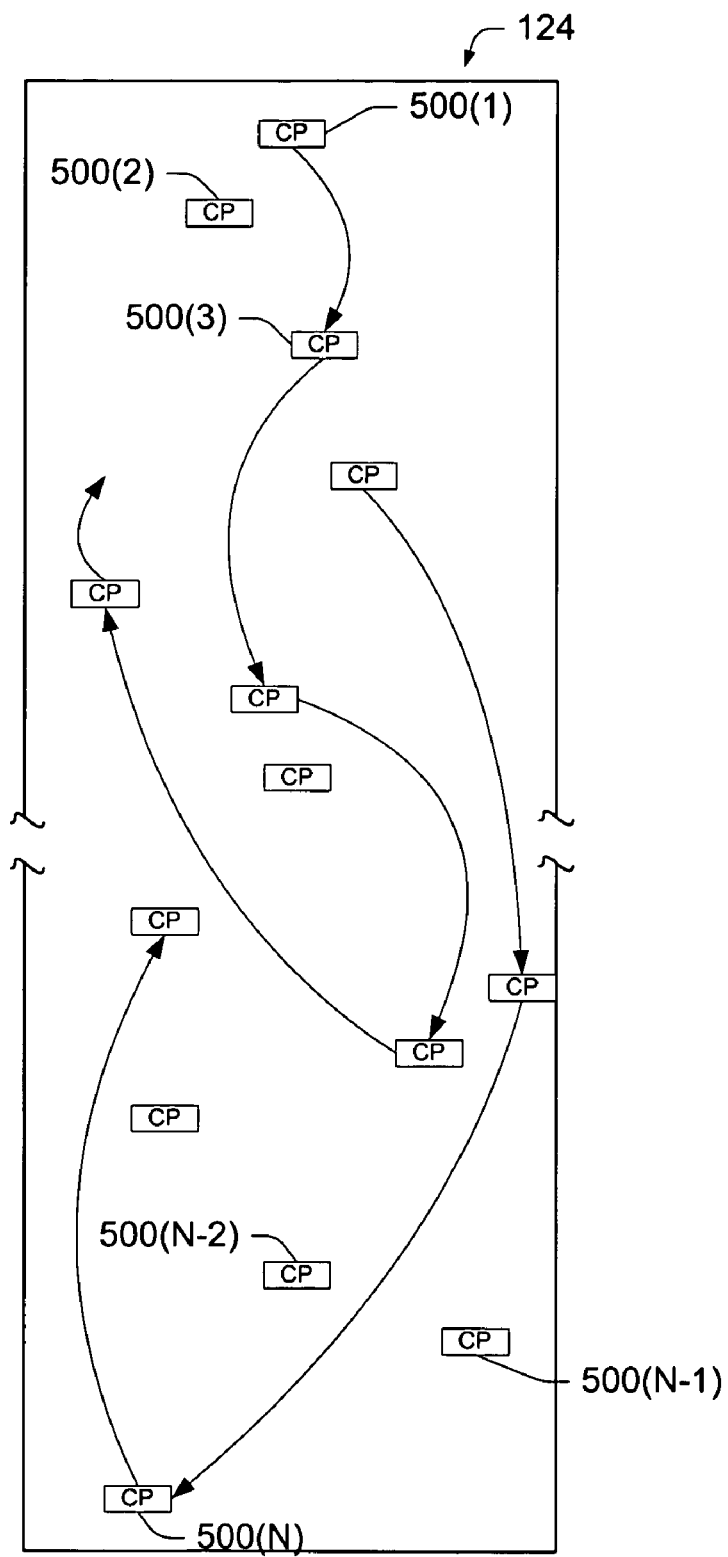
FIG. 5 is a diagrammatical illustration of a protected digital good that is shipped to a client, and shows an evaluation flow through the digital good that the client uses to evaluate the authenticity of the good.

FIG. 5 shows the protected digital good 124 as shipped to the client, and illustrates control flow through the good as the client-side evaluator 152 evaluates the good 124 for any sign of tampering. The protected digital good 124 has multiple checkpoints 500(1), 500(2), . . . , 500(N) randomly spread throughout the good. When executing the digital good 124, the evaluator 152 passes through the various checkpoints 500(1)–500(N) to determine whether the checks are valid, thereby verifying the authenticity of the protected digital good.

If any checkpoint fails, the client is alerted that the digital good may not be authentic. In this case, the client may refuse to execute the digital good or disable portions of the good in such a manner that renders it relatively useless to the user.

Exemplary Protection Tools

The obfuscator 134 illustrated in FIG. 2 shows sixteen protection tools 136(1)–136(16) that may be used to protect the digital good in some manner. The tools are typically invoked after the parser 200 has parsed the digital good into multiple segments. Selected tools are applied to selected segments so that when the segment good is reassembled, the resulting protected digital good is a composite of variously protected segments that are extremely difficult to attack. The sixteen exemplary tools are described below in greater detail.

Oblivious Checking

One tool for making a digital good more difficult to attack is referred to as "oblivious checking". This tool performs checksums on bytes of the digital product without actually reading the bytes.

More specifically, the oblivious checking tool is designed so that, given a function f, the tool computes a checksum S(f) such that:

(1) If f is not changed, S(f) can be verified to be correct.

(2) If f is changed to f', S(f') ≠ S(f) with extremely high probability.

Figure 6:
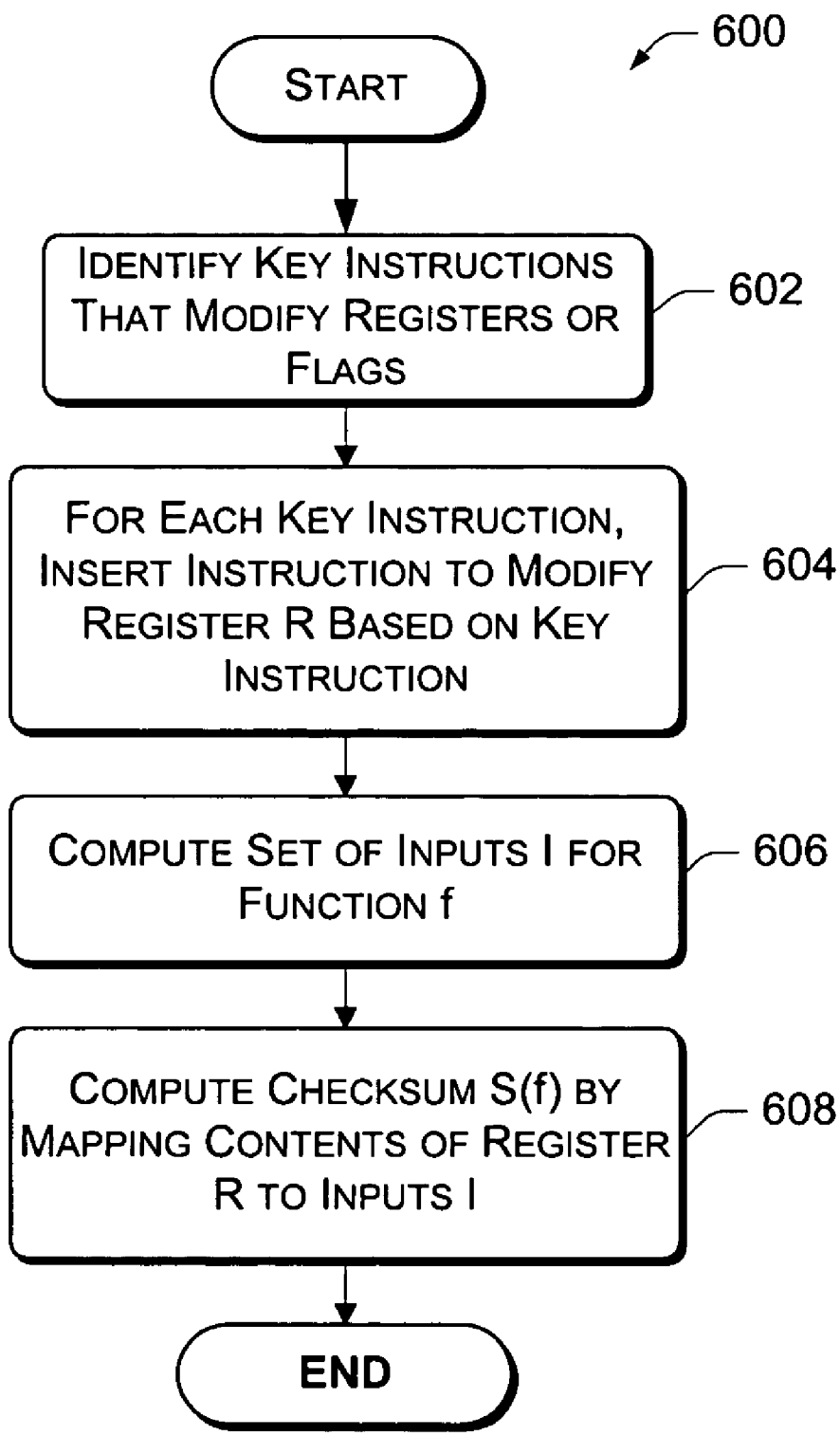
FIG. 6 is a flow diagram of an oblivious checking process that may be employed by the system of FIG. 2.

FIG. 6 illustrates an exemplary implementation of an oblivious checking process 600 implemented by the oblivious checking tool 136(1) in the obfuscator 134. The first few blocks 602–606 are directed toward instrumenting the code for function f. At block 602, the tool identifies instructions in the software code that possibly modify registers or flags. These instructions are called "key instructions". Alternatively, other instructions (or groups of instructions) could be the key instructions.

For each key instruction, the tool inserts an extra instruction(s) that modifies a register R in a deterministic fashion based on the key instruction (block 604). This extra instruction is placed anywhere in the code, but in one implementation is placed with the requirement that it is always executed if the corresponding key instruction is executed, and moreover, is always executed after the key instruction. The control flow of function f is maintained as originally designed, and does not change. Thus, after instrumenting the code, each valid computation path of function f is expected to have instructions modifying R in various ways.

At block 606, the tool derives an input set "I" containing inputs x to the function f, which can be denoted by I={$x_1$, $x_2$, $x_3$ . . . $x_n$}. The input set "I" may be derived as a set of input patterns to function f that ensures that most or all of the valid computation paths are taken. Such input patterns may be obtained, for example, from profile data that provides information about typical runs of the entire program. The input set "I" may be exponential in the number of branches in the function, but should not be too large a number.

At block 608, the tool computes S(f) through the use of a mapping function g, which maps the contents of register R to a random element of I with uniform probability. Let f(x) denote the value of register R, starting with 0, after executing f on input x. The function f(x) may be configured to be sensitive to key features of the function so that if a computation path were executed during checksum computation, then any significant change in it would be reflected in f(x) with high probability.

One implementation of computing checksum S(f) is as follows:

Start with $x = x_0$
$Cks := f(x_0)$ XOR $x_0$
For i=1 to K do
$\quad x_i := g(f(x_{i-1}))$
$\quad Cks \mathrel{+}= f(x_i)$ XOR $x_i$
End for The resulting checksum S(f) is the initial value $x_0$, along with the value Cks, or $(x_0, Cks)$. Notice that the output of one iteration is used to compute the input of the next iteration. This loop makes the checksum shorter, since there is only one initial input instead of a set of K independent inputs (i.e., only the input $x_0$ rather than the entire set of K inputs), although all of the K inputs need to be made otherwise available to the evaluator verifying the checksum.

Each iteration of the loop traverses some computation path of the function f. A random factor may optionally be included in determining which computation path of the function f to traverse. Preferably, each computation path of function f has the same probability of being examined during one iteration. For K iterations, the probability of a particular path being examined is:

$1 - (1 - 1/n)^K \approx K/n$, where n=card (I).

It should be noted that, although various randomness may be included in the oblivious checking as mentioned above, such randomness should be implemented in a manner that can be duplicated during verification (e.g., to allow the checksum S(f) to be re-calculated and verified). For example, the randomness introduced by the oblivious checking tool 136(1) may be based on a random number seed and pseudo-random number generator that is also known to evaluator 152 of FIG. 1.

Code Integrity Verification

Another tool for embedding some protection into a digital good is known as "code integrity verification". This tool defines one or more segments of the digital good with "begin" and "end" labels. Each pair of labels is assigned an identification tag. The tool computes a checksum of the data bytes located between the begin and end labels and then hides the checksum somewhere in the digital good.

Figure 7:
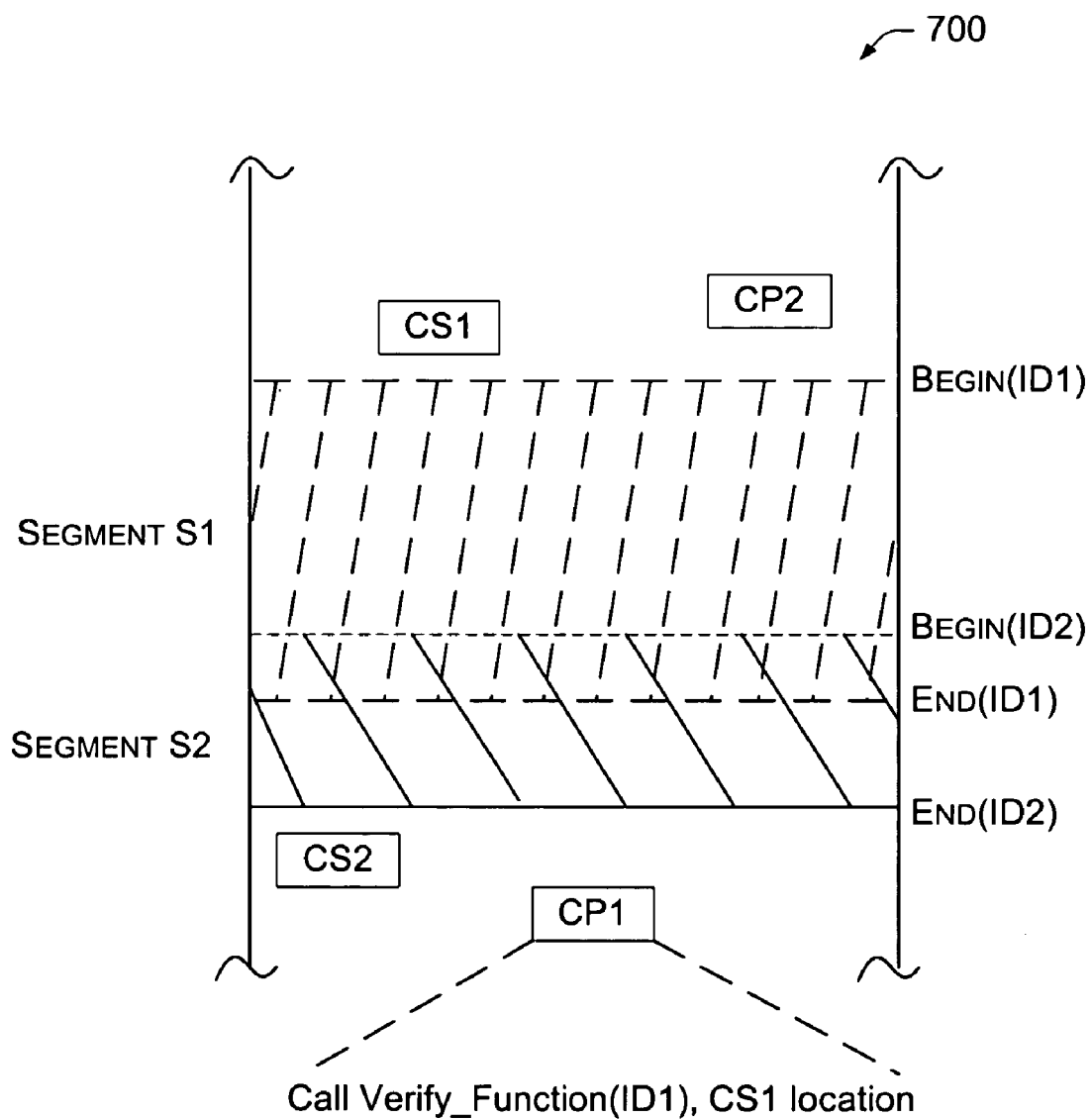
FIG. 7 is a diagrammatic illustration of a digital good that is modified to support code integrity verification.

FIG. 7 shows a portion of a digital good 700 having two segments S1 and S2. In the illustration, the two segments partially overlap, although other segments encoded using this tool may not overlap at all. The first segment S1 is identified by begin and end labels assigned with an identification tag ID1, or Begin(ID1) and End(ID1). The second segment S2 is identified by begin and end labels assigned with an identification tag ID2, or Begin(ID2) and End(ID2).

The code integrity verification tool computes a checksum of the data bytes between respective pairs of begin/end labels and stores the checksum in the digital good. In this example, the checksums CS1 and CS2 are stored in locations that are separate from the checkpoints.

The tool inserts a checkpoint somewhere in the digital good, outside of the segment(s). FIG. 7 illustrates two checkpoints CP1 and CP2 for the associated segments S1 and S2, respectively. Each checkpoint contains a function call to a verification function that, when executed, computes a checksum of the corresponding segment and compares that result with the precomputed checksum hidden in the digital good. The checkpoints therefore have knowledge of where the precomputed checksums are located. In practice, the precomputed checksums CS1 and CS2 may be located at the checkpoints, or separately from the checkpoints as illustrated.

When the client executes the digital good, the client-side evaluator 152 comes across the checkpoint and calls the verification function. If the checksums match, the digital good is assumed to be authentic; otherwise, the client is alerted that the digital good is not authentic and may be an illicit copy.

Acyclic (Dag-Based) Code Integrity Verification

Acyclic, or dag-based, code integrity verification is a tool that is rooted in the code integrity verification, but accommodates more complex nesting among the variously protected segments. "Dag" stands for "directed acyclic graph". Generally speaking, acyclic code integrity verification imposes an order to which the various checkpoints and checksum computations are performed to accommodate the complex nesting of protected segments.

Figure 8:
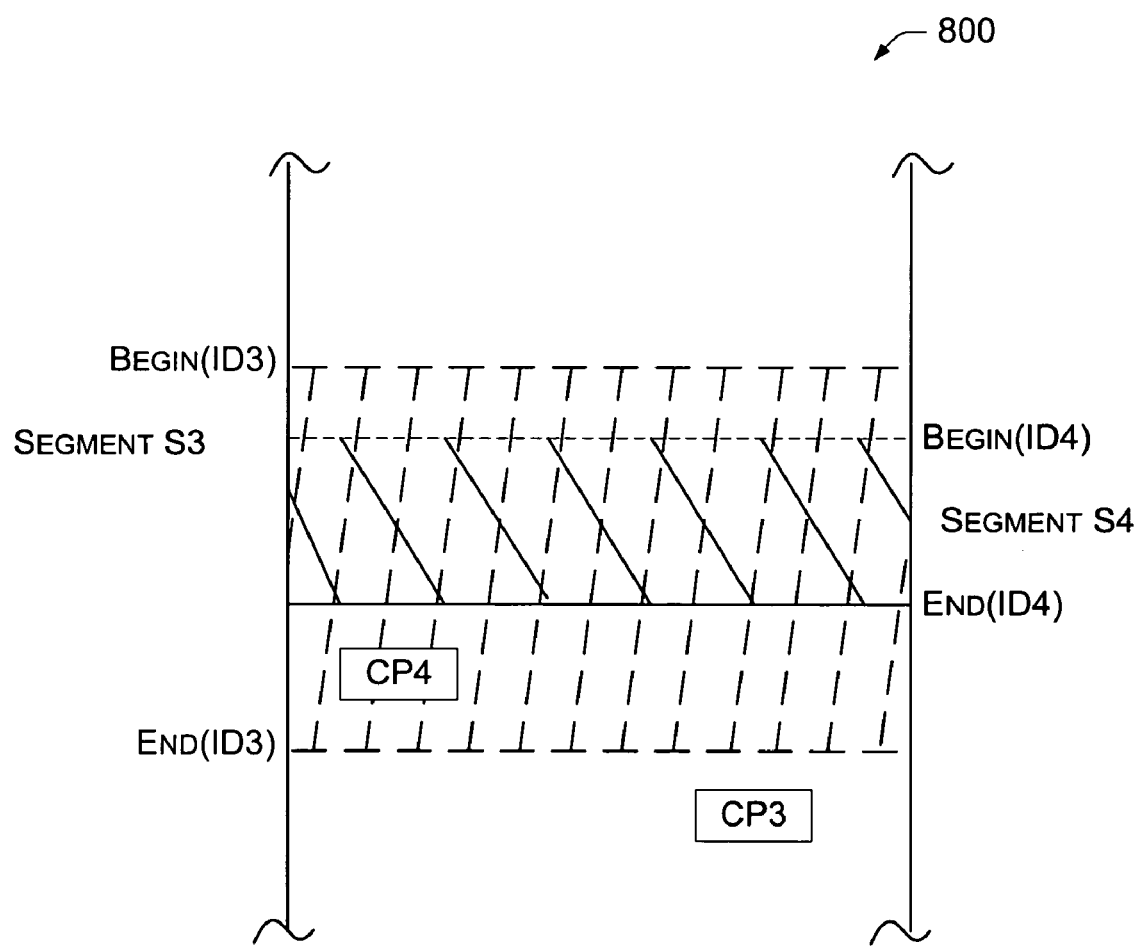
FIG. 8 is a diagrammatic illustration of a digital good that is modified to support cyclic code integrity verification.

FIG. 8 shows a portion of a digital good 800 having one segment S4 completely contained within another segment S3. The checkpoint CP4 for segment S4 is also contained within segment S3. In this nesting arrangement, executing checkpoint CP4 affects the bytes within the segment S3, which in turn affects an eventual checksum operation performed by checkpoint CP3. Accordingly, evaluation of segment S3 is dependent on a previous evaluation of segment S4.

The acyclic code integrity verification tool 136(2) attempts to arrange the numerous evaluations in an order that handles all of the dependencies. The tool employs a topological sort to place the checkpoints in a linear order to ensure that dependencies are handled in an orderly fashion.

Cyclic Code Integrity Verification

Cyclic code-integrity verification extends dag-based verification by allowing cycles in the cross-verification graph. For example, if code segment S4 verifies code segment S5, and S5 also verifies S4, we have a cycle consisting of the nodes S4 and S5. With such cycles, a proper order for checksum computation does not exist. Thus, a topological sort does not suffice, and some checksums may be computed incorrectly. Cycles require an additional step to fix up any affected checksums.

One specific method of correcting checksums is to set aside and use some "free" space inside protected segments. This space, typically one or a few machine words, is part of the code bytes verified by checksum computation. If a particular checksum is incorrect, the extra words can be changed until the checksum becomes proper. While cryptographic hash functions are specifically designed to make this impractical, we can use certain cryptographic message authentication codes (MACs) as checksums to achieve this easily.

Secret Key Scattering

Secret key scattering is a tool that may be used to offer some security to a digital good. Cryptographic keys are often used by cryptography functions to code portions of a digital product. The tool scatters these cryptographic keys, in whole or in part, throughout the digital good in a manner that appears random and untraceable, but still allows the evaluator to recover the keys. For example, a scattered key might correspond to a short string used to compute indices into a pseudorandom array of bytes in the code section, to retrieve the bytes specified by the indices, and to combine these bytes into the actual key.

There are two types of secret key scattering methods: static and dynamic. Static key scattering methods place predefined keys throughout the digital good and associate those keys in some manner. One static key scattering technique is to link the scattered keys or secret data as a linked list, so that each key references a next key and a previous or beginning key. Another static key scattering technique is subset sum, where the secret key is converted into an encrypted secret data and a subset sum set containing a random sequence of bytes. Each byte in the secret data is referenced in the subset sum set. These static key scattering techniques are well known in the art.

Dynamic key scattering methods break the secret keys into multiple parts and then scatter those parts throughout the digital good. In this manner, the entire key is never computed or stored in full anywhere on the digital good. For instance, suppose that the digital good is encrypted using the well-known RSA public key scheme. RSA (an acronym for the founders of the algorithm) utilizes a pair of keys, including a public key e and a private key d. To encrypt and decrypt a message m, the RSA algorithm requires:

Encrypt: $y = m^e \bmod n$

Decrypt: $y^d = (m^e)^d \bmod n = m$

The secret key d is broken into many parts:

$d = d_1 + d_2 + \ldots + d_k$

The key parts $d_1, d_2, \ldots d_k$ are scattered throughout the digital good. To recover the message during decryption, the client computes:

$y^{d_1} = z_1$ $y^{d_2} = z_2$ $\vdots$ $y^{d_k} = z_k$ where, $m = z_1 \cdot z_2 \cdot \ldots \cdot z_k$ Obfuscated Function Execution Another tool that may be used to protect a digital good is known as "obfuscated function execution". This tool subdivides a function into multiple blocks, which are separately encrypted by the secure processor. When executing the function, the secure processor uses multiple threads to decrypt each block into a random memory area while executing another block concurrently. More specifically, a first process thread decrypts the next block and temporarily stores the decrypted block in memory. Simultaneously, a second process thread executes and then destroys the code in the current block.

The benefit of this tool is that only one block is visible at a time, while the other blocks remain encrypted. On the Intel ×86 platform, code run in this manner should be self-relocatable, which means that function calls are typically replaced with calls via function pointers, or an additional program step fixes up any function calls that use relative addressing. Other platforms may have other requirements.

Code as an S-Box

Many ciphers, including the Data Encryption Standard (DES), use several substitution boxes (S-boxes) to scramble data. An S-box is essentially a table that maps n-bit binary strings onto a set of m-bit binary strings, where m and n are small integers. Depending on the cipher, S-boxes may be fixed or variable. Both S-boxes and code segments can be viewed simply as arrays of bytes, so an important code segment can be used as an S-box for a cipher to encrypt another important segment. If a cracker patches the segment serving as the S-box, the encrypted segment will be incorrectly decrypted. This is similar in spirit to using a segment's checksum as the decryption key for another segment, but is subtler and better obfuscated.

Encryption/Decryption

Another tool to protect a digital good is encryption and decryption. This tool breaks the digital good into different chunks and then encrypts each chunk using different keys. The chunks might represent multi-layered and overlapping code sections. Checksums of code sections can serve as encryption keys.

Probabilistic Checking

The secure processor has its own pseudorandom-number generator (PRNG) that can be used to perform security actions, such as integrity verification, with certain probabilities. Probabilistic checking uses these probabilities to ensure that a protected program behaves differently during each run. For example, some checks could be during every run, others approximately every other run, and still others only occasionally. This makes the cracker's task much more difficult, since a program no longer exhibits definite, repeatable behavior between runs. In fact, a patched program may work properly once or twice, leading the cracker to believe that his efforts were successful; however, the program will fail in a subsequent run. This is part of an overall strategy of varying paths of execution between runs to complicate reverse engineering, as described elsewhere in this document.

Boolean Check Obfuscation

Boolean checking utilizes Boolean functions to evaluate the authenticity of code sections or results generated from executing the code. A problem with Boolean checking is that an attacker can often identify the Boolean function and rewrite the code to avoid the Boolean check. According, the Boolean check obfuscation tool attempts to hide the Boolean function so that it is difficult to detect and even more difficult to remove.

Consider, for example, the following Boolean check that compares a register with a value "1" as a way to determine whether the digital good is authentic or a copy.

COMP reg1, 1
   BEQ good_guy
   (crash)
good_guy (go on)

In this example, if the compare operation is true (i.e., the Boolean check is valid), the program is to branch to "good_guy" and continue. If the compare is false, the program runs instructions that halt operation. To defeat this Boolean check, an attacker merely has to change the "branch equal" or "BEQ" operation to a "branch always" condition, thereby always directing program flow around the "crash" instructions.

There are many ways to obfuscate a Boolean check. One approach is to add functions that manipulate the register values being used in the check. For instance, the following operations could be added to the above set of instructions:

```
SUB reg1, 1
ADD sp, reg1
    :
COMP reg1, 1
```
These instructions change the contents of register 1. If an attacker alters the program, there is a likelihood that such changes will disrupt what values are used to change the register contents, thereby causing the Boolean check to fail.

Another approach is to add "dummy" instructions to the code. Consider the following:
```
LEA reg2, good_guy
SUB reg2, reg1
INC reg2
JMP reg2
```
The "subtract", "increment", and "jump" instructions following the "load effective address" are dummy instructions that are essentially meaningless to the operation of the code.

A third approach is to employ jump tables, as follows:
```
MOV reg2, JMP_TAB[reg1]
JMP reg2
JMP_TAB: <bad_guy jump>
         <good_guy jump>
```
The above approaches are merely a few of the many different ways to obfuscate Boolean checks. Others may also be used.

In-Lining

The in-lining tool is useful to guard against single points of attack. The secure processor provides macros for inline integrity checks and pseudorandom generators. These macros essentially duplicate code, adding minor variations, which make it difficult to attack.

Reseeding of PRG With Time Varying Inputs

Many software products are designed to utilize random bit streams output by pseudo random number generators (PRGs). PRGs are seeded with a set of bits that are typically collected from multiple different sources, so that the seed itself approximates random behavior. One tool to make the software product more difficult to attack is to reseed the PRGs after every run with time varying inputs so that each pass has different PRG outputs.

Anti-Disassembly Methods

Disassembly is an attack methodology in which the attacker studies a print out of the software program and attempts to discover hidden protection schemes, such as code integrity verification, Boolean check obfuscation, and the like. Anti-disassembly methods try to thwart a disassembly attack by manipulating the code is such a manner that it appears correct and legitimate, but in reality includes information that does not form part of the executed code.

One exemplary anti-disassembly method is to employ almost plaintext encryption that indiscreetly adds bits to the code (e.g., changing occasional opcodes). The added bits are difficult to detect, thereby making disassembly look plausible. However, the added disinformation renders the print-out not entirely correct, rendering the disassembly practices inaccurate.

Another disassembly technique is to add random bytes into code segments and bypass them with jumps. This serves to confuse conventional straight-line disassemblers.

Shadowing

Another protection tool shadows relocatable addresses by adding "secret" constants. This serves to deflect attention away from crucial code sections, such as verification and encryption functions, that refer to address ranges within the executing code. Addition of constants (within a certain range) to relocatable words ensures that the loader still properly fixes up these words if an executable happens not to load at its preferred address. This particular technique is specific to the Intel x86 platform, but variants are applicable to other platforms.

Varying Execution Path Between Runs

One protection tool that may be employed to help thwart attackers is to alter the path of execution through the software product for different runs. As an example, the code may include operations that change depending on the day of week or hour of the day. As the changes are made, the software product executes differently, even though it is performing essentially the same functions. Varying the execution path makes it difficult for an attacker to glean clues from repeatedly executing the product.

Anti-Debugging Methods

Anti-debugging methods are another tool that can be used to protect a digital good. Anti-debugging methods are very specific to particular implementations of the digital good, as well as the processor that the good is anticipated to run on.

As an example, the client-side secure processor may be configured to provide kernel-mode device drivers (e.g., a WDM driver for Windows NT and 2000, and a VxD for Windows 9x) that can redirect debugging-interrupt vectors and change the x86 processor's debug address registers. This redirection makes it difficult for attackers who use kernel debugging products, such as SoftICE. Additionally, the secure processor provides several system-specific methods of detecting Win32-API-based debuggers. Generic debugger-detection methods include integrity verification (to check for inserted breakpoints) and time analysis (to verify that execution takes an expected amount of time).

Separation in Time/Space of Tamper Detection and Response

Another tool that is effective for protecting digital goods is to separate the events of tamper detection and the eventual response. Separating detection and response makes it difficult for an attacker to discern what event or instruction set triggered the response.

These events may be separated in time, whereby tamper detection is detected at a first time and a response (e.g., halting execution of the product) is applied at some subsequent time. The events may also be separated in space, meaning that the detection and response are separated in the product itself.

Conclusion

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. One or more computer readable media having stored thereon a program that, when executed by one or more processors, causes the one or more processors to perform acts including:

identifying a plurality of key instructions in a function;

inserting into the function, for each of the plurality of key instructions, an extra instruction that modifies content of a register based at least in part on the corresponding key instruction;

identifying a set of inputs to the function, wherein the identifying a set of inputs comprises identifying a set of input patterns to the function that result in different valid computation paths in the function being taken; and determining a checksum for the function based at least in part on modifications made to the content of the register by the extra instructions when the function is executed with the set of inputs.

2. One or more computer readable media as recited in claim 1, wherein the identifying a plurality of key instructions comprises identifying, as a key instruction, each instruction in the function that possibly modifies the content of a register or a flag.

3. One or more computer readable media as recited in claim 1, wherein the identifying a plurality of key instructions comprises identifying, as the plurality of key instructions, a plurality of instructions that each modify the content of one or more registers or one or more flags.

4. One or more computer readable media as recited in claim 1, wherein the inserting comprises inserting each extra instruction in a location within the function so that the extra instruction is executed if the corresponding key instruction is executed.

5. One or more computer readable media as recited in claim 1, wherein the inserting comprises inserting each extra instruction in a location within the function so that the extra instruction is executed after the corresponding key instruction is executed.

6. One or more computer readable media as recited in claim 1, wherein the inserting comprises inserting the extra instructions into the function without altering the control flow of the function.

7. One or more computer readable media as recited in claim 1, wherein the inserting comprises inserting, for at least one of the plurality of key instructions, a plurality of extra instructions that modify one or more registers.

8. One or more computer readable media as recited in claim 1, wherein the identifying a set of inputs comprises identifying a set of input patterns to the function that result in all valid computation paths in the function being taken.

9. One or more computer readable media as recited in claim 1, wherein the determining comprises determining as the checksum both an initial value ($x_0$) and a calculated value (Cks), wherein the initial value is a first input of the set of inputs, and wherein the calculated value is calculated according to the following process:

Start with $x=x_0$
Cks:=$f(x_0)$ XOR $x_0$
For i=1 to K do
　$x_i$:=$g(f(x_{i-1}))$
　Cks +=$f(x_i)$ XOR $x_i$
End for
wherein K is the number of inputs in the set of inputs and g represents the mapping function.

10. One or more computer readable media as recited in claim 1, wherein the function is part of a software program.

11. One or more computer readable media as recited in claim 1, wherein the determining comprises determining the checksum so that if the function is changed the checksum will also change.

12. One or more computer readable media as recited in claim 1, the acts further including:
repeating execution of the function with a different input of the set of inputs until the function has been executed with each input of the set of inputs.

13. A method implemented at least in part by a computing device, the method comprising:
generating a checksum on bytes of a digital good based on modifications made by the digital good rather than on reading the bytes, wherein the generating comprises:
identifying a plurality of key instructions in a function;
inserting into the function, for each of the plurality of key instructions, an extra instruction that modifies a register based at least in part on the corresponding key instruction;
identifying a set of inputs to the function; and
determining a checksum for the function by mapping contents of the register to the set of inputs, wherein the determining comprises determining as the checksum both an initial value ($x_0$) and a calculated value (Cks), wherein the initial value is a first input of the set of inputs, and wherein the calculated value is calculated according to the following process:

Start with $x=x_0$
Cks:=$f(x_0)$ XOR $x_0$
For i=1 to K do
　$x_i$:=$g(f(x_{i-1}))$
　Cks +=$f(x_i)$ XOR $x_i$
End for
wherein K is the number of inputs in the set of inputs and g represents the mapping function.

14. The method as recited in claim 13, wherein the identifying comprises identifying, as a key instruction, each instruction in the function that possibly modifies a register or a flag.

15. One or more computer-readable memories comprising computer-readable instructions that, when executed by a processor, direct a computer system to perform the method as recited in claim 13.

16. A method implemented at least in part by a computing device, the method comprising: method comprising:
inserting, into a segment of a digital good, a plurality of instructions that modify content of a register;
identifying a set of inputs to the segment, wherein the identifying a set of inputs comprises identifying a set of input patterns to the segment that result in different valid computation paths in the segment being taken; and
determining a checksum value for the segment based at least in part on modifications made to the content of the register by the plurality of instructions when the plurality of instructions are executed with the set of inputs to the segment.

17. The method as recited in claim 16, wherein the inserting comprises:
identifying a plurality of key instructions in the segment; and
inserting into the segment, for each of the plurality of key instructions, an extra instruction that modifies the content of a register based at least in part on the corresponding key instruction.

18. The method as recited in claim 17, wherein the identifying a plurality of key instructions comprises identifying, as a key instruction, each instruction in the segment that possibly modifies the content of a register or a flag.

19. The method as recited in claim 17, wherein the identifying a plurality of key instructions comprises identifying, as the plurality of key instructions, a plurality of instructions that each modify the content of one or more registers or one or more flags.

20. The method as recited in claim 16, wherein the inserting comprises inserting each of the plurality of instructions in a location within the segment so that the instruction is executed if a corresponding key instruction is executed.

21. The method as recited in claim 16, wherein the inserting comprises inserting each of the plurality of instructions in a location within the segment so that the instruction is executed after a corresponding key instruction is executed.

22. The method as recited in claim 16, wherein the inserting comprises inserting the extra instructions into the segment without altering a control flow of the segment.

23. The method as recited in claim 16, wherein the inserting comprises inserting a plurality of extra instructions that modify the content of one or more registers.

24. The method as recited in claim 16, wherein the identifying a set of inputs comprises identifying a set of input patterns to the segment that result in all valid computation paths in the segment being taken.

25. The method as recited in claim 16, wherein the determining comprises determining as the checksum value both an initial value ($x_0$) and a calculated value (Cks), wherein the initial value is a first input of the set of inputs, and wherein the calculated value is calculated according to the following process:
Start with $x=x_0$
Cks:=$f(x_0)$ XOR $x_0$
For i=1 to K do
$x_i:=g(f(x_{i-1}))$
Cks +=$f(x_i)$ XOR $x_i$
End for
wherein K is the number of inputs in the set of inputs and g represents the mapping function.

26. The method as recited in claim 16, wherein the digital good comprises a software program.

27. One or more computer-readable memories comprising computer-readable instructions that, when executed by a processor, direct a computer system to perform the method as recited in claim 16.

28. The method as recited in claim 16, wherein the determining comprises determining the checksum value so that if the segment is changed the checksum value will also change.

29. The method as recited in claim 16, further comprising: executing the segment a plurality of times, each execution using a different input of the set of inputs.

30. A production system, comprising:
a memory to store an original program; and
a production server equipped with an oblivious checking protection tool that is used to augment the original program for protection purposes, the production server being configured to identify a plurality of segments in the original program and apply oblivious checking to each of the plurality of segments by:
  inserting, into the segment, a plurality of instructions that modify content of a register;
  identifying a set of inputs to the segment, wherein the identifying a set of inputs comprises identifying a set of input patterns to the segment that result in different valid computation paths in the segment being taken; and
  determining a checksum value for the segment based at least in part on modifications made to the content of the register by the plurality of instructions when the segment is executed with the set of inputs.

31. A production system as recited in claim 30, wherein the inserting comprises:
  identifying a plurality of key instructions in the segment; and
  inserting into the segment, for each of the plurality of key instructions, an extra instruction that modifies the content of a register based at least in part on the corresponding key instruction.

32. A production system as recited in claim 31, wherein the identifying a comprises identifying, as a key instruction, each instruction in the segment that possibly modifies the content of a register or a flag.

33. A production system as recited in claim 30, wherein the inserting comprises inserting the extra instructions into the segment without altering a control flow of the segment.

34. A client-server system, comprising:
a production server to apply oblivious checking to a program to produce a protected program by:
  inserting, into a segment of the program, a plurality of instructions that modify content of a register;
  identifying a set of inputs to the segment; and
  determining a checksum value for the segment based at least in part on modifications made to the content of the register by the plurality of instructions when the segment is executed with the set of inputs, wherein the determining comprises determining as the checksum both an initial value ($x_0$) and a calculated value (Cks), wherein the initial value is a first input of the set of inputs, and wherein the calculated value is calculated according to the following process:
Start with $x=x_0$
Cks:=$f(x_0)$XOR $x_0$
For i=1 to K do
$X_i:=g(f(x_{i-i}))$
Cks +=$f(x_i)$ XOR $x_i$
End for
wherein K is the number of inputs in the set of inputs and g represents the mapping function; and
a client to store and execute the protected program, the client being configured to evaluate the protected program to determine whether the protected program has been tampered with.

35. A client-server system as recited in claim 34, wherein the client is to evaluate the protected program by:
  generating a checksum value for each of a plurality of segments of the program based at least in part on both a set of inputs to the segment and the content of a register that results from applying the set of inputs to the segment;
  comparing, for each of the plurality of segments, the generated checksum value to a stored checksum value corresponding to the segment; and
  determining the protected program has been tampered with if the generated checksum value for any one or more of the plurality of segments does not match the stored checksum value for the segment.

36. A client-server system as recited in claim 34, wherein the program comprises a software program.

37. One or more computer readable media having stored thereon a plurality of instructions that, when executed by one or more processors, causes the one or more processors to perform acts including:
  generating a checksum value for a segment of a digital good based at least in part on both a set of inputs to the segment and the content of a register that results from applying the set of inputs to the segment and modification of the content of the register by instructions in the segment, wherein the set of inputs comprises a set of input patterns to the segment that result in different valid computation paths in the segment being taken;
  comparing the generated checksum value to a stored checksum value corresponding to the segment; and
  determining that the digital good has been tampered with if the generated checksum value does not match the stored checksum value.

38. One or more computer readable media as recited in claim 37, wherein the plurality of instructions further cause the one or more processors to perform acts including repeating the generating, comparing, and determining for a plurality of segments of the digital good.

39. One or more computer readable media as recited in claim 37, wherein the digital good comprises a software program.

* * * * *

UNITED STATES PATENT AND TRADEMARK OFFICE
CERTIFICATE OF CORRECTION

PATENT NO. : 7,080,257 B1  Page 1 of 1
APPLICATION NO. : 09/651901
DATED : July 18, 2006
INVENTOR(S) : Mariusz H. Jakubowski et al.

It is certified that error appears in the above-identified patent and that said Letters Patent is hereby corrected as shown below:

In column 4, line 38, after "digital" delete "9".

In column 4, line 47, after "portions" delete "16".

In column 7, line 61, delete "$CP_{+4}$" and insert -- $CP_{i+4}$ --, therefor.

In column 11, line 48, after "where, m=" delete "$z_1$" and insert -- $Z_1$ --, therefor.

In column 16, line 31, in Claim 16, after "the method comprising:"
delete "method comprising:".

In column 18, line 26, in Claim 34, delete "$X_i:=g(f(x_{i-1}))$" and insert -- $X_i:=g(f(x_{i-1}))$ --, therefor.

Signed and Sealed this

Twentieth Day of July, 2010

David J. Kappos
*Director of the United States Patent and Trademark Office*